United States Patent [19]

Haynes

[11] Patent Number: 4,611,999
[45] Date of Patent: * Sep. 16, 1986

[54] MARINE PROPULSION DEVICE WITH GASEOUS BOUNDARY LAYER FOR THRUST JET FLOW STREAM

[76] Inventor: Hendrick W. Haynes, Freelance Industrial/Wolfpak, P.O. Box 66152, Seattle, Wash. 98166

[*] Notice: The portion of the term of this patent subsequent to Nov. 12, 2002 has been disclaimed.

[21] Appl. No.: 450,369

[22] Filed: Dec. 16, 1982

Related U.S. Application Data

[63] Continuation of Ser. No. 50,199, Jun. 20, 1979, Pat. No. 4,552,537.

[51] Int. Cl.[4] ............................................. B63H 11/04
[52] U.S. Cl. ......................................... 440/47; 440/45
[58] Field of Search ....................... 440/38, 44, 45, 47; 60/221

[56] References Cited

U.S. PATENT DOCUMENTS

| 207,018 | 8/1878 | Cowles et al. | 440/38 |
| 1,662,206 | 3/1928 | Paxton | 440/38 |
| 3,273,333 | 9/1966 | Roulund | 440/44 |
| 3,643,438 | 2/1972 | Barsby | 440/45 |

FOREIGN PATENT DOCUMENTS 2323029 11/1974 Fed. Rep. of Germany ........ 440/38

Primary Examiner—Trygve M. Blix
Assistant Examiner—Thomas J. Brahan

[57] ABSTRACT

A marine jet propulsion system for use as an inboard engine for boats is herein described. An engine or motor means is attached in a driving relationship to a pump and thrust output means. Heat generated by and rejected by the engine or motor is passed into the pump base for dissipation into the outputted jet thrust stream. Air and/or exhaust gas from the engine is ejected around the jet output stream to reduce against-the-hull and jet stream or thrust energy losses. Streamlining hull closures for the jet pump intake and output ports are provided to reduce system hull drag when not in use and to limit marine organism growth inside the pump.

5 Claims, 11 Drawing Figures

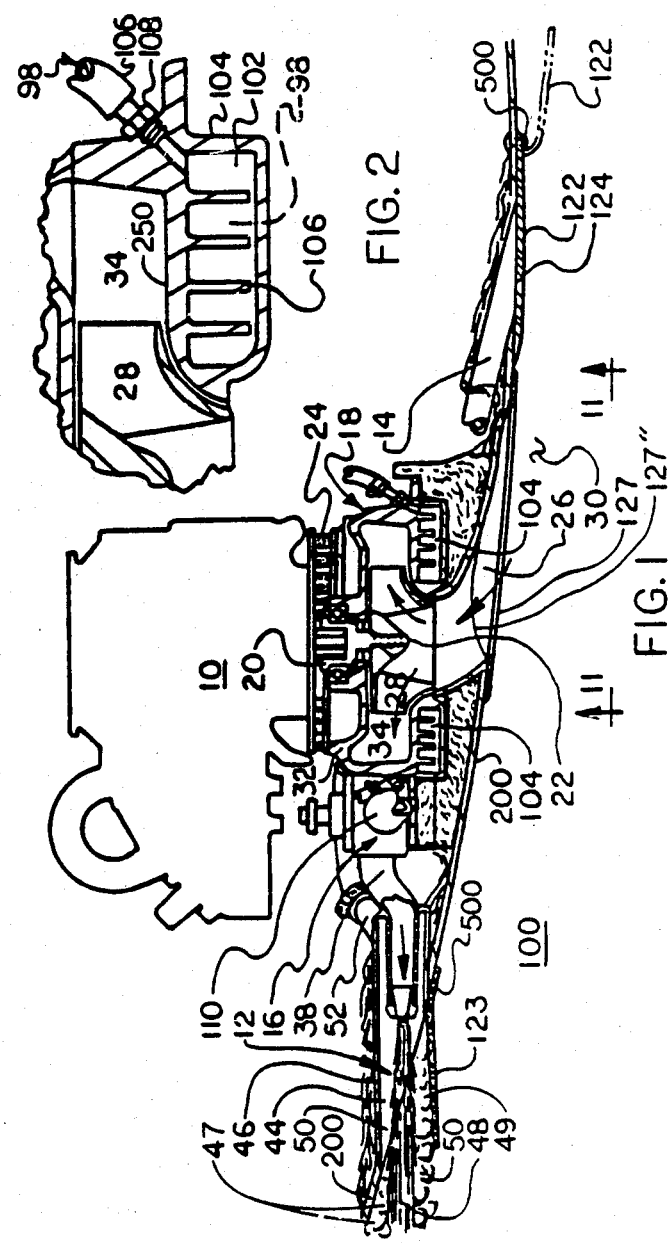

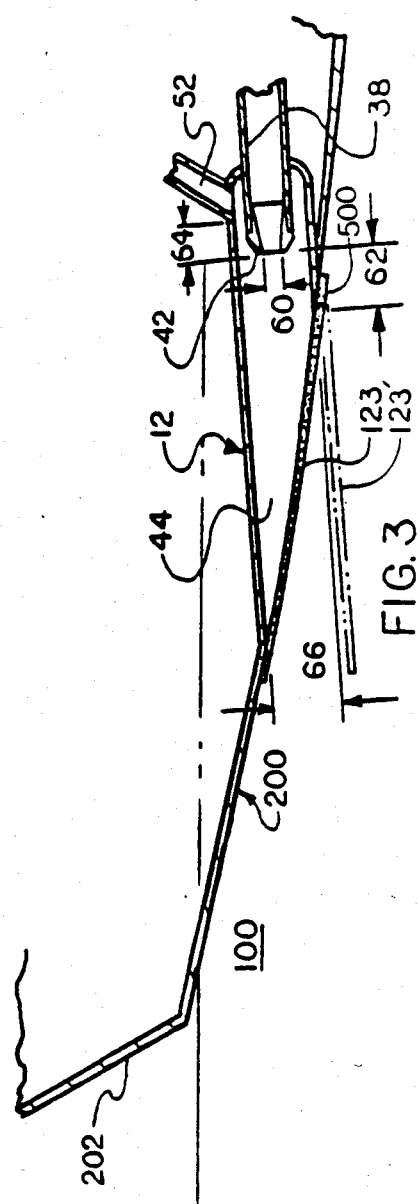

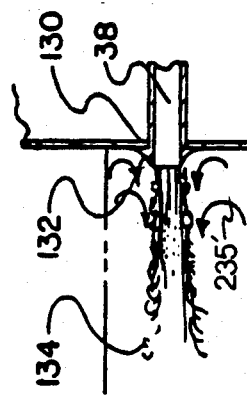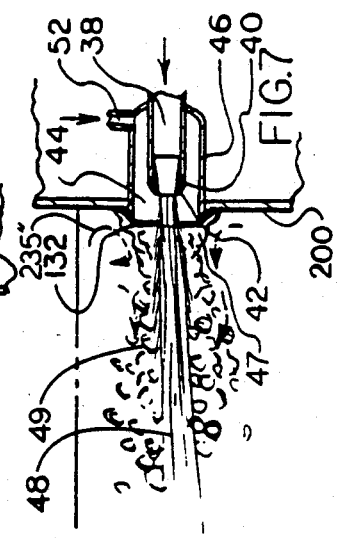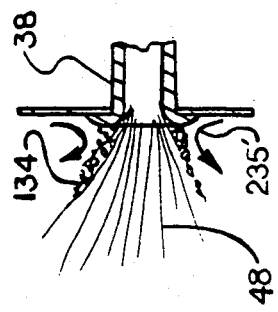

MARINE PROPULSION DEVICE WITH GASEOUS BOUNDARY LAYER FOR THRUST JET FLOW STREAM

This application is a continuation of Ser. No. 06/050,199 now U.S. Pat. No. 4,552,537.

BACKGROUND OF THE INVENTION

Inboard auxiliary or main drive engines which use directed water for propulsive power such as propellers and marine jets develop thrust by transfer of momentum from the ejected water to the boat. With propeller drives and submarine discharging jets, the ejected water transfers a significant percentage of its thrust back into the hull, called a "thrust deduction factor," as a result of a negative pressure turbulent wake created largely against the aft portion of the hull. The remaining thrust, or actual propulsive thrust, acts to drive the hull into equilibrium with hull resistance as the vessel accelerates to speed. The invention herein described provides a means wherein heat from the motor or engine is used to raise the temperature of the exterior boundry layer water used for thrust in a jet pump. Also, the engine or motor exhaust gases are vented around the outside of the ejected jet stream. The gases around the jet stream, as the stream leaves the boat hull at high speed, expands much easier than the jet stream, therefore substantially reducing the thrust deduction factor, and increasing net submarine discharging jet efficiency. The increase in water temperature over ambient water by the warmed pump casing increases the propensity of air to come out of solution in the jet stream, and lowers the energy required to cause the jet stream to "supercavitate" as it leaves the jet stream nozzle. This increases pump efficiency proportional to the drop in energy required and lost in passing the jet stream into supercavitating flow. To reduce parasitic hull drag and deterioration of jet efficiency by marine life growing inside the jet pump, streamlining and sealing hull closures are incorporated. These principles hold for use of the system as a conventional marine auxiliary and power plant, as well as a thrusting device such as bow and stern thrusters.

OBJECTS AND ADVANTAGES

It is an object of this invention to provide a simple means whereby the marine engine is continuously cooled with fresh, non-corrosive coolant.

It is an object of this invention to provide a means whereby heat rejected by the engine or motor may be recovered in the jet pump propulsive fluid and aid in providing thrust.

It is another object of this invention to provide a means whereby the thrust loss associated with "thrust deduction" may be substantially reduced and engine exhaust energy recovered.

It is another object of this invention to provide a thrust port means which streamlines the jet output and input ports and renders the hull drag free and reduces marine growth inside the pump when the jet pump is not in use.

It is a further object of this invention to provide a marine propulsive device and bow thruster with lower energy losses than the marine jet pumps currently employed in the art with submarine or underwater discharging nozzles.

These and other objects and advantages shall become apparent from the following description taken in conjunction with the accompanying drawings in which:

THE DRAWINGS

FIG. 1 is a cross-section of the propulsion unit taken on line 1—1 of FIG. 9, showing the passing of gases or gaseous layer against-the-hull and surrounding the jet stream 48.

FIG. 2 is a detail cross-section of the motor heat exchanger and jet pump combination for the transfer of rejected heat into the pump jet stream as a preferred embodiment.

FIG. 3 is a detailed cross-section of the obliquely angled jet output of FIG. 1 around which atmospheric gas and/or engine exhaust is introduced to surround the output jet stream and flow against-the-hull surface.

FIG. 4 is an output jet nozzle of an auxiliary drive penetrating through the boat hull and exhibiting an extended edge to aid supercavitating flow.

FIG. 5 is a cross-section of an output jet nozzle of a bow thruster with an extended lip to aid the output flow of the jet in passing into the supercavitating flow regime.

FIG. 6 is a cross-section of a conventional bow thruster nozzle with arrows indicating the direction of fluid flow and the dispersement of thrust lines.

FIG. 7 is a cross-section of an output nozzle for the bow thruster utilizing air and/or engine exhaust as a hull isolating surrounding gaseous fluid for the jet output thrusting water stream.

SPECIFIC DESCRIPTION OF THE INVENTION

Figure 8:
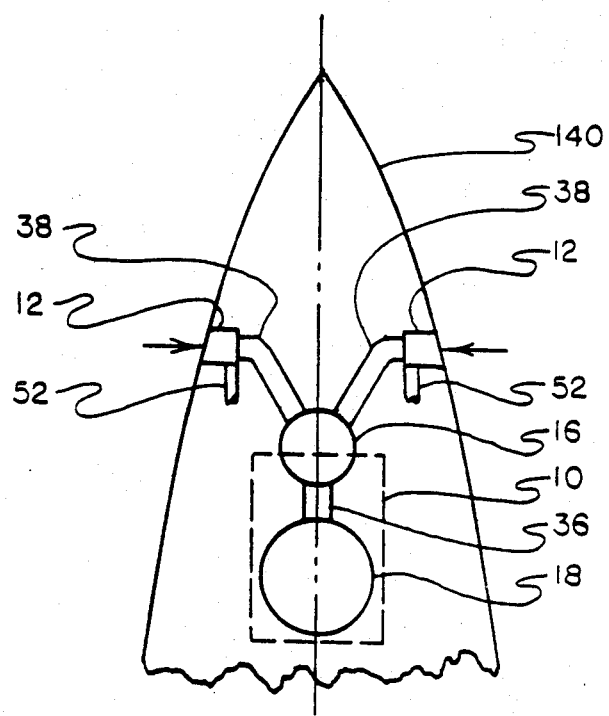
FIG. 8 is a plan view of the mechanical-hydraulic lay-out of the bow thruster application of the propulsion apparatus.

The propensity of a moving fluid to follow a curved surface is well known in the art, and its effects explored in such apparatus as stream tubes, lifting bodies (wings), etc. Work by Bernoulli, Taylor, Coanada and others on the utilization of high speed jet streams to create lift is legend in this regard. In the marine art, thrust generating output streams are generally discharged underwater in displacement type boats. The discharge of water away from the boat bottom 200 in the general proximity ahead or forward of the transom will cause, depending on the fineness of the vessel stern and the water velocity, the ejected fluid to follow the curvature of the hull ("Coanda Effect"). The disruption of this straight flow ejection pattern or deflection of the jet stream path from its normal course requires work, this being taken from the vessel. Examples of this in a displacement boat is the "squatting" in the stern caused by wave phenominon and the propellers low pressure field adjacent to the stern as the vessel increases speed. In the art, this "thrust relation" with the vessel exists roughly stated as $$\text{Thrust}_{True} = (1 - D_T)\left[\cos\theta_s\left(\frac{\phi}{2} A_p (V_1^2 - V_e^2)\right)\right]$$

Where:

$A_p$=Propeller Disc area $(\pi/4)D^2 FT^2$ or $M^2$ or jet output cross-sectional area.

B=Breadth of hull relative to shaft or jet output centerline and mean plate line at midship section, in feet.

$D_T$=Taylor thrust deduction valve based on block coefficient and may be calculated:

$$\text{Block Coef.} = C_b = \frac{\text{Immersed Volume}}{L \times B \times D_v}$$

Thrust deduction $D_T$ then equals=(for a single screw or jet propulsion submarine discharging pump)

$D_T$=0.375 $C_b$−0.0375 (over $C_b$ range of 0.5 to 0.9).

$D_v$=Mean draft of hull relative to shaft or jet output centerline and mean plate line at midship section, in ft.

L=Length between hull perpendiculars, in ft., relative to propeller shaft or jet output centerline.

$V_l$=Exit velocity in Ft./Sec. or M/Sec. of propeller wake or jet output.

$V_e$=Advance velocity in ft./sec. or M/Sec.

$\theta_s$=Propeller shaft centerline or jet output angle relative to vessel waterline.

$\phi$=Mass density of water (1.94 fresh water, 1.99 salt water British; 102 fresh water, 104 salt water, metric).

It is apparent that the free propeller thrust $$\left[\cos\theta_s\left(\frac{\phi}{2} A_p(V_1^2 - V_e^2)\right)\right]$$

is radically affected by the Taylor correction factor $(1-D_t)$. The Taylor correction factor varies with the Block Coefficient. Note that $D_t$ can go from a Thrust Subtraction factor of 15% to 40% of the propulsion systems free thrust lost to the stern, or upwards toward and beyond 50% lost into the sides of a vessel (in the bow thruster case) as unusable eddy current losses. The Haynes invention, with the controlled interjection of air, allows the ejected fluid to follow a straight path away from the curvature of the hull. Thus momentum transfer losses are minimized.

In C. B. Cox et al (U.S. Pat. No. 3,288,100) a tapered venturi is proposed to mix air with the marine jet output stream through a helical stator. In W. R. Christensen (U.S. Pat. No. 3,188,997) a high velocity stream of water is passed through a mixing venturi to mix air or gases with the output jet stream. Although in both the above cases some of the gases entrained in the jet output is available for expansion on the outside of the jet stream and reducing hull suction, a significant expansion of the jet stream occurs, reducing thrust, as a direct of the jet stream inducing viscous shear in surrounding fluid and inducing a negative pressure wake on the body from whcih the high speed thrust stream is leaving ("Coanda Effect"). In the invention, the thrust output portions (12, 14) break the "Coanda Effect" by supplying a gas or gaseous layer against-the-hull at the hull bottom 200 and surronding the jet stream 48.

The heretofore described system expressed as an auxiliary drive internal to and mounted to a hull of displacement character consisting of an engine or motor 10, a forward thrust output portion 12, a reverse thrust output portion 14, a thrust direction selector valve 16 and a jet pump 18. Engine or motor 10 is connected to jet pump 18 by a coupling 20 on the impeller shaft 22. Engine 10 is mounted on the pump 18, in the preferred embodiment, by flexible motor mounts 24. Pump 18 consists of a water intake region 26 directed into or toward the impeller 28. Impeller 28 accelerates the intake water 30 through the pump casing 32 and into the pump water discharge passageway 34. Water 30 is accelerated and a pre-rotational or rotating moment introduced in the water picked up into the impeller eye, in another embodiment (not shown) by water prewirling static vanes in the pump intake, and are redirected by the pumps diffuser vanes, also mounted statically. These vanes also aid in heat dissipation from the heat exchanger, as later elaborated on.

Other known pump forms, such as staged mixed and axial flow pumps, may be incorporated into the invention without departing from the spirit and intent of the invention.

The water expressed out of pump 18 through passageway 34 is directed under pressure by a connecting means or passageway 36 to thrust directional control valve 16. In the forward thrust direction mode, water at high velocity is ejected out of valve 16 into thrust tube 38. Thrust tube 38 terminates in a conically tapered nozzle 40 directed away from the vessel propulsion direction. Tapered nozzle 40 has a backward radiused or sharp upped surface 42 to form a divergent annular passage and allow the gases 50 in the jacketing region 44 of tube 46 to cleanly accelerate and surround ejected expressed thrust stream 48 with a boundary layer of such gases extending externally of the hull as shown in FIG. 1. A jacketing region 44 is recessed into hull bottom 200 at an oblique angle relative to hull bottom 200. Jacket 44 is flush with respect to hull bottom 200 (see FIG. 3). Gases 50 are directed into jacket 44 by exhaust tube 52 from engine or motor 10 up to a pressure of 3 atmospheres absolute or may be drawn from an ambient pressure air supply. As the jet stream 48 is discharged, through a penetration in the hull, into the water surrounding the vessel 100, it is commonly found in the art that a suction is created against the hull. This hull bottom 200 suction due to the "Coanda Effect" is relieved by a blanketing gaseous barrier layer 47 over bottom 200. The low viscosity and easily expanded boundary layer of air and/or exhaust barrier gases 47 is directed by jacket 44, e.g. the air or gas flowing onto and along hull bottom 200 and around said jet stream 48. The jet stream 48 is coated by a surrounding or blanketing air and/or gas covering 49 for at least a short distance from the boat bottom 200. Preferably (see FIG. 3) the shortest length jacketing region 44 should be behind the end of most rearward extent 62 of surface 42 is dead flush or no ($\phi$) nozzle inside diameter 60, with the recommended length no more than five (5) nozzle diameters 60, with one (1) to three (3) yielding good results. The jacket 44 inside cross-sectional area should have a minimum of one and one half (1.5) times the nozzle 60 cross sectional area, but should not be any greater than six (6.0) times the output nozzle cross-sectional area. Generally area ratios within 2.0 to 3.5 yield good results.

The entrance tube for gas flow introduction should be no less than one (1) diameter 60 from end plane established by nozzle 40 end, although the tube can be located closer with useable results. The ratios are "tuned" and in proper relationship when the gas barriers 47 and 49 are adequately supplied with gases, as is shown in FIGS. 1 and 7.

The pump 18 is heated by motor or engine 10 rejected heat, and thereby acts as an engine or motor heat exchanger. Pump efficiency is increased through the heating of a thin film of water flowing over the pump casings interior volume. The heating of this thin boundry layer of water lowers its viscosity and brings air out of solution, causing this fluid to break into supercavitating turbulent flow at a lower energy loss level than if this boundry layer would not be heated. Lower pump casing internal "skin" friction losses are the result, increasing pump efficiency. The pump 18 is heated by liquid at a temperature above the water temperature of water 100 being injected into a finned and labyrinthine passageway 102 in sealed chambers 104. Hose 106 passes the heated engine water 98 through fitting 108 into passageway 102. The heated water 98 passes under and, as application permits around and over the pump and through fins 106. The casing walls conduct heat into the surface lining the interior of the marine jet pump. The cooled engine cooling water 98 leaves passageway 102 through line 110 whereon water 98 is returned via convection or coolant pump to cool engine 10.

When valve 16 is put in the thrust reverse mode, water 30 is passed into reverse tube 120 whereon the fluid is routed ahead of the pump intake and discharged as a thrust stream 48. A thin flexible material, such as a rubber of low durometer and with a specific gravity less than 1 (allowing it to "float" closed when the engine is turned off), flap 122 is placed over the reverser tube to streamline reverser thrust output port 124 when not in use. A flap 123 over the forward thrust port made by tube 12 may be similarly provided with equal streamlining and marine biostatic results. When reverse thrust is in use, flap 122 is blown open and reverse thrust is created. When forward thrust is in use, flap 123 is blown open and forward thrust is created. A flush closing intake valve 125 is provided such that when the propulsion jet is turned off and therefore no longer drawing intake water into the pump, the pump intake is closed off. This reduces the boat or vessel hull drag when under sail (sailboat case) and prohibits the intrusion of marine life into the pump. A butterfly type valve 125 is prefered, although a slitted flexible thin rubber closure 127 fixed to the boat bottom (and opened by pump intake suction) may be used. Other known flush closing valves, such as sliding or gate valves, may also be used. NOTE: If the thrust loss is critical in the reverse direction, a nozzle similar to nozzle 12 may be incorporated in the design.

In FIG. 4 a supercavitating nozzle not utilizing a gas jacket around the thrust output stream 48 is shown. A lip 126 is extended beyond boat hull bottom 200 by about 20% to 100% of tube 38's inside diameter. The outside of the tube is preferably radiused with the hull. This allows a turn-around region for vortexing fluid flow and reduces the nozzle area subjected to supercavitating shear. A similar nozzle 130 is shown in FIG. 5 as a cross-section, in a bow thruster application. Lines of flow 235' indicate the water 100's vortexing and energy deduction action. A cavitating region 132 draws air out of solution with the water and reduces thrust deduction. However, energy must be lost from the jet stream and momentum transfer diffused due to stream expansion (see FIG. 6) and loss of the energy needed to "pull" air out of water solution and to cavitating or boiling water 134 through a sudden pressure drop adjacent to the hull 200. In FIG. 7 a bow thruster jet output nozzle utilizing the same preferred thrust output principles as in FIGS. 1 and 3 is shown. However, the thrust deduction factor is less than 5% due to the attachment of the air against-the-hull, as shown by lines of flow arrows 235″ and gas 47, compared to FIG. 6, e.g., a conventional thruster thru-hull at about 40 to 50%. The relative proportions are the same as for thrust output tube 12. The taper within nozzle 40 should be less than 6° and not have steps in going to conformity with tube 38.

In FIG. 8, a prefered plan-view relationship is shown supplying side thrust to maneuver a bow 140 of a vessel or ship (arrows show thrust direction). Valve 16 is then 'Y' shaped and selects between port and starboard thrust. Air is injected at lines 52.

Figure 9:
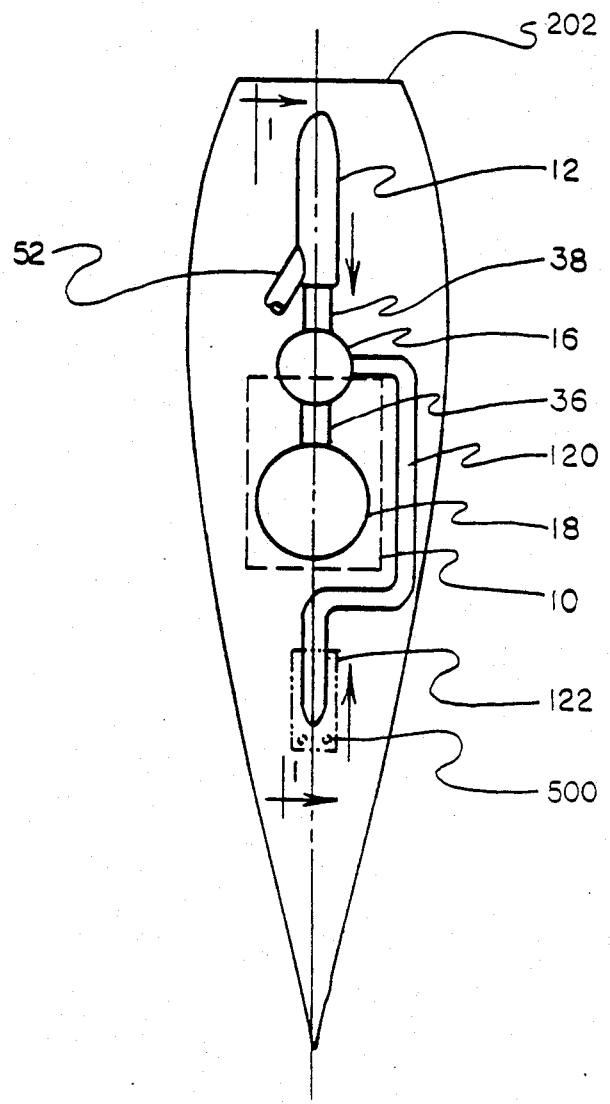
FIG. 9 is a plan view of the mechanical-hydraulic lay-out of the jet auxiliary drive for marine use.
Figure 10:
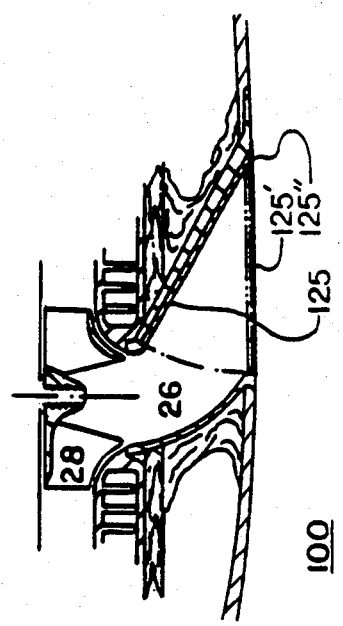
FIG. 10 is an alternate pump intake configuration employing a butterfly valve opened by pump intake pressure.
Figure 11:
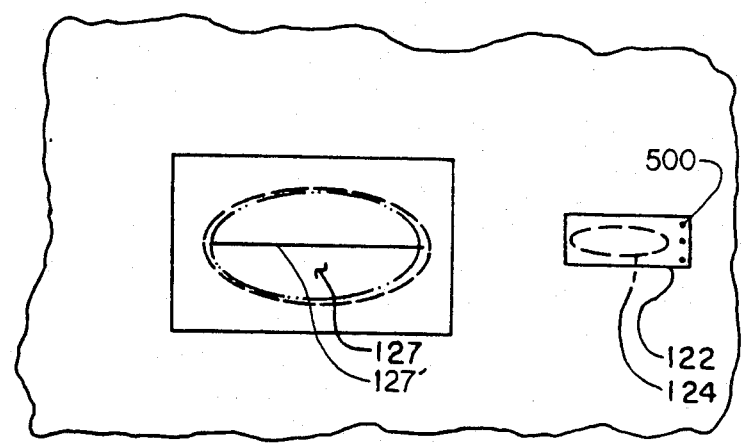
FIG. 11 is a bottom view of the pump intake of FIG. 1 incorporating a thin rubber closure and shown engine off (closed).

FIG. 9 shows a preferred plan-view relationship for the invention used as a marine auxiliary. Steerage as a marine auxiliary is provided by a steering rudder located aft of the jet output, preferable greater than 30 inches. In neutral, the thrust valve 16 directs water flow equally out both thrust ports, and proportionally divides thrust as it is moved from 100% forward (or port) to 100% aft (or starboard).

While a specific embodiment of an improved marine propulsion motor and propulsion system associated therewith have been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In combination with a marine craft including a hull having a submerged surface portion within which a discharge opening is formed and thrust jet propelling means for discharging a jet flow stream of water from the discharge opening along a discharge path, including a nozzle from which the jet flow stream emerges, a jacket having a predetermined passage diameter and length in enclosing relation to the jet flow stream, a source of gas, and means for introducing the gas into the jacket to form a gaseous boundary layer in surrounding relation to the jet flow stream, the improvement residing in reducing thrust deduction losses of the jet propelling means ordinarily resulting from deflection of the discharge path of the jet flow stream externally toward the surface portion of the hull, comprising means for pressurizing the gas to a predetermined pressure within the jacket, said jacket having an outlet end at the discharge opening substantially flush with the surface portion of the hull, and means mounting the nozzle in operative relation to the jacket and the discharge opening for the formation of the gaseous boundary layer against the hull and extending the gaseous boundary layer therefrom under said predetermined pressure externally of the hull for expansion relative to the jet flow stream under suction pressures developed externally on the surface portion of the hull adjacent thereto.

2. The improvement as defined in claim 1 wherein the nozzle mounting means comprises a convergent passage section having an outlet end of a cross-sectional area between 1/6 and ⅔ of the predetermined passage cross-sectional area of the jacket and spaced from the discharge opening along the discharge path of the jet flow stream between zero and five times the outlet end diameter.

3. The combination of claim 2 wherein the surface portion of the hull is curved and said discharge path of the jet flow stream extends at an acute angle from the surface portion.

4. The combination of claim 1 wherein the surface portion of the hull is curved and said discharge path of the jet flow stream extends at an acute angle from the surface portion.

5. A unit of claim 1, wherein the exterior of said nozzle region is closed off by a flexurally attached flap (122 & 123) and said flap is attached along a single edge (500) by a fastening means, and this edge being orientated forwardly in the direction of the vessels direction of travel, wherein the forward movement of said boat will cause said flap to rotate about said fastening means at edge (500) and cause the substantially flush closure of said flap (122 & 123) against the boat bottom (200) and the laying over of said nozzle (40), and upon expressing a thrust stream (48) said flap (122 & 123) will be rotated rearwardly against and about said fastening means at edge (500), allowing said thrust stream (48) to pass by said flap (122 & 123).

* * * * *